US012692985B1

(12) United States Patent
Zhang et al.

(10) Patent No.: US 12,692,985 B1
(45) Date of Patent: Jul. 28, 2026

(54) CARBON DIOXIDE ENERGY STORAGE SYSTEM, LUBRICATING OIL SUPPLY DEVICE THEREOF, AND CONTROL METHOD THEREFOR

(71) Applicant: Exax Energy Technology (Shenzhen) Co., Ltd, Shenzhen (CN)

(72) Inventors: Jie Zhang, Shenzhen (CN); Qin Wang, Shenzhen (CN)

(73) Assignee: Exax Energy Technology (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 19/344,611

(22) Filed: Sep. 30, 2025

(30) Foreign Application Priority Data

Feb. 28, 2025 (CN) .......................... 202510229145.7

(51) Int. Cl.
| | |
|---|---|
| *F16N 7/38* | (2006.01) |
| *F01K 13/00* | (2006.01) |
| *F01M 1/02* | (2006.01) |
| *F01M 1/16* | (2006.01) |
| *F17C 13/00* | (2006.01) |
| *F25J 3/02* | (2006.01) |

(52) U.S. Cl.
CPC ............ *F17C 13/002* (2013.01); *F01K 13/00* (2013.01); *F01M 1/02* (2013.01); *F01M 1/16* (2013.01); *F16N 7/38* (2013.01); *F25J 3/0266* (2013.01); *F17C 2221/013* (2013.01)

(58) Field of Classification Search
CPC .. F17C 13/002; F17C 2221/013; F01K 13/00; F01M 1/02; F01M 1/16; F16N 7/38; F25J 3/0266
See application file for complete search history.

(56) References Cited

U.S. PATENT DOCUMENTS 12,091,978 B1 * 9/2024 Baker, Jr. ................ F01B 29/10

FOREIGN PATENT DOCUMENTS

| CN | 204283524 U | * | 4/2015 | |
|---|---|---|---|---|
| CN | 216767491 U | | 6/2022 | |
| CN | 116221616 A | | 6/2023 | |
| CN | 116857027 A | | 10/2023 | |
| CN | 117190044 A | * | 12/2023 | |
| CN | 117628836 A | | 3/2024 | |
| CN | 117847394 A | * | 4/2024 | ............. F16N 7/385 |
| CN | 222026765 U | | 11/2024 | |
| CN | 121024728 A | * | 11/2025 | ................ H02J 3/28 |

* cited by examiner

*Primary Examiner* — Matthew T Largi

(57) ABSTRACT

A carbon dioxide energy storage system, a lubricating oil supply device thereof, and a control method therefor are provided. The lubricating oil supply device includes a first oil supply unit and a second oil supply unit respectively connected among a lubricating oil tank, an energy storage component, and an energy release component. The first oil supply unit is configured to supply a first oil amount of lubricating oil to the energy storage component and the energy release component, and the second oil supply unit is configured to supply a second oil amount of the lubricating oil to the energy storage component and the energy release component. The second oil supply unit is connected to a liquid storage unit and driven by taking high-pressure carbon dioxide gas contained in the liquid storage unit as a power source to supply the lubricating oil.

9 Claims, 1 Drawing Sheet

CARBON DIOXIDE ENERGY STORAGE SYSTEM, LUBRICATING OIL SUPPLY DEVICE THEREOF, AND CONTROL METHOD THEREFOR

CROSS-REFERENCE TO RELATED APPLICATION

This application claims priority to Chinese Patent Application No. 202510229145.7, filed on Feb. 28, 2025, which is herein incorporated by reference in its entirety.

TECHNICAL FIELD

The disclosure relates to the field of carbon dioxide energy storage technologies, and more particularly to a carbon dioxide energy storage system, a lubricating oil supply device thereof, and a control method therefor.

BACKGROUND

Utilizing clean energy such as solar and wind power to slow down consumption of non-renewable traditional energy sources such as coal and oil has become an inevitable choice. Due to intermittent, fluctuating, and off-peak power generation characteristics of the clean energy, an energy storage technology has become one of key technologies for development of the clean energy. Currently, an energy storage technology based on gas-liquid phase change cycle of carbon dioxide compresses and condenses gaseous carbon dioxide at ambient temperature and pressure in a gas storage unit into liquid carbon dioxide to store in a liquid storage unit by using surplus power or the clean energy in a low power consumption period, stores heat energy generated in a compression process, and heats the liquid carbon dioxide into the gaseous carbon dioxide during a peak power consumption period by using the heat energy stored. The gaseous carbon dioxide drives a turbine to drive a generator to generate electricity, and the gaseous carbon dioxide after doing work returns to the gas storage unit for recycling. The energy storage technology based on the gas-liquid phase change cycle of carbon dioxide has gradually attracted widespread attention due to its advantages of simple structure, flexible layout, and high energy storage efficiency.

A carbon dioxide energy storage system includes high-speed rotating mechanical devices, mainly including a compressor on an energy storage side and the turbine on an energy release side. These high-speed rotating mechanical devices need to be equipped with corresponding lubricating oil supply devices. Currently, a lubricating oil supply device in the carbon dioxide energy storage system is similar to that in a generator set in a traditional thermal power generation system, mainly including one or two (one in use and one for standby) main working oil pumps driven by alternating current asynchronous motors and one emergency oil pump driven by a direct current motor. When the generator set is in normal operation, the main working oil pumps are driven by alternating current power supplied by a plant power system to supply lubricating oil. In a case of emergency, such as a power failure in the plant power system, the emergency oil pump is quickly started by an independent direct current battery and a corresponding electronic control system to ensure emergency shutdown of the generator set. Currently, an electronic control system of the emergency oil pump is relatively complicated, such as a technical solution disclosed in a Chinese patent with a publication No. CN216767491U, which requires controlling many nodes, resulting in a high failure rate. Moreover, the emergency oil pump relies on an external power source disposed outside an energy storage system, resulting in a slower response speed. In the case of emergency, failure of the emergency oil pump to start in an interlocked manner may lead to safety accidents and significant economic losses. Therefore, how to improve reliability of emergency lubricating oil supply in the carbon dioxide energy storage system is a problem that needs to be solved.

SUMMARY

Aiming at deficiencies in related art, the disclosure provides a carbon dioxide energy storage system, a lubricating oil supply device thereof, and a control method therefor to solve a problem of how to improve reliability of emergency lubricating oil supply in the carbon dioxide energy storage system.

To achieve the aforementioned objective, the disclosure adopts the following technical solutions.

In a first aspect, the disclosure provides the lubricating oil supply device of the carbon dioxide energy storage system. The carbon dioxide energy storage system includes an energy storage component, an energy release component, and a liquid storage unit. The liquid storage unit is configured to store liquid carbon dioxide, and high-pressure carbon dioxide gas is contained in the liquid storage unit. The lubricating oil supply device includes a first oil supply unit and a second oil supply unit respectively connected among a lubricating oil tank, the energy storage component, and the energy release component. The first oil supply unit is configured to supply a first oil amount of lubricating oil to the energy storage component and the energy release component. The second oil supply unit is configured to supply a second oil amount of the lubricating oil to the energy storage component and the energy release component.

The second oil supply unit is connected to the liquid storage unit and driven by taking the high-pressure carbon dioxide gas contained in the liquid storage unit as a power source to supply the lubricating oil.

In an embodiment, the second oil supply unit includes a second oil pump, a second pipeline, and a second driving mechanism. The second oil pump is disposed inside the lubricating oil tank and connected to the energy storage component and the energy release component through the second pipeline. The second driving mechanism is a pneumatic rotary driving mechanism and connected to the liquid storage unit. The second driving mechanism is configured to drive, under rotation driven by the high-pressure carbon dioxide gas contained in the liquid storage unit, the second oil pump to supply the lubricating oil.

In an embodiment, the second driving mechanism includes a vane rotary cylinder, a gas pipeline, and a charged normally closed solenoid valve (also referred to as an energized normally-closed solenoid valve). The vane rotary cylinder is connected to the second oil pump and configured to rotationally drive the second oil pump. The gas pipeline is connected between the liquid storage unit and the vane rotary cylinder and configured to transport the high-pressure carbon dioxide gas in the liquid storage unit to the vane rotary cylinder to thereby drive the vane rotary cylinder to rotate. The charged normally closed solenoid valve is connected to the gas pipeline.

In an embodiment, the carbon dioxide energy storage system further includes a shaft seal gas storage container. The shaft seal gas storage container is configured to store shaft seal gas. The second driving mechanism further includes an exhaust pipeline. The exhaust pipeline is connected between the vane rotary cylinder and the shaft seal gas storage container. The exhaust pipeline is configured to transport carbon dioxide gas discharged by the vane rotary cylinder to the shaft seal gas storage container. A gas pressure regulating valve is disposed on the gas pipeline.

In an embodiment, the second oil amount is smaller than the first oil amount.

In an embodiment, the first oil amount is 2-3 times of the second oil amount.

In an embodiment, the first oil supply unit includes a first oil pump, a first pipeline, and a first driving mechanism. The first oil pump is disposed inside the lubricating oil tank and connected to the energy storage component and the energy release component through the first pipeline. The first driving mechanism is configured to drive the first oil pump.

The first pipeline includes a first oil supply main pipeline, a first oil supply branch, and a second oil supply branch. A first end of the first oil supply main pipeline is connected to an output end of the first oil pump. First ends of the first oil supply branch and the second oil supply branch are individually connected to a second end of the first oil supply main pipeline. A second end of the first oil supply branch is connected to the energy storage component. A second end of the second oil supply branch is connected to the energy release component. A first oil supply valve is disposed on the first oil supply branch. A second oil supply valve is disposed on the second oil supply branch.

The second pipeline includes a second oil supply main pipeline, a third oil supply branch, and a fourth oil supply branch. A first end of the second oil supply main pipeline is connected to an output end of the second oil pump. First ends of the third oil supply branch and the fourth oil supply branch are individually connected to a second end of the second oil supply main pipeline. A second end of the third oil supply branch is connected to the energy storage component. A second end of the fourth oil supply branch is connected to the energy release component. A third oil supply valve is disposed on the third oil supply branch. A fourth oil supply valve is disposed on the fourth oil supply branch.

In a second aspect, the disclosure provides the carbon dioxide energy storage system. The carbon dioxide energy storage system includes a gas storage unit, the energy storage component, the liquid storage unit, and the energy release component sequentially connected in a closed loop, and the carbon dioxide energy storage system further includes the lubricating oil supply device.

In a third aspect, the disclosure provides the control method for the carbon dioxide energy storage system. The control method includes:

controlling the first oil supply unit to simultaneously supply the lubricating oil to the energy storage component and the energy release component when the carbon dioxide energy storage system is in normal operation;

starting the second oil supply unit to simultaneously supply the lubricating oil to the energy storage component and the energy release component when the carbon dioxide energy storage system is in a failing state to cause the first oil supply unit unable to supply the lubricating oil.

In an embodiment, the second oil amount is smaller than the first oil amount, and the control method includes:

controlling the first oil supply unit to supply the lubricating oil to the energy storage component and controlling the second oil supply unit to supply the lubricating oil to the energy release component, when the carbon dioxide energy storage system is in the normal operation, the energy storage component is in an energy storage operation condition and the energy release component is in a turning operation condition;

controlling the first oil supply unit to supply the lubricating oil to the energy release component and controlling the second oil supply unit to supply the lubricating oil to the energy storage component, when the carbon dioxide energy storage system is in the normal operation, the energy release component is in an energy release operation condition, and the energy storage component is in the turning operation condition;

controlling the second oil supply unit to simultaneously supply the lubricating oil to the energy storage component and the energy release component when the carbon dioxide energy storage system is in the failing state to cause the first oil supply unit unable to supply the lubricating oil.

The disclosure provides the carbon dioxide energy storage system, the lubricating oil supply device thereof, and the control method therefor. The second oil supply unit for supplying emergency lubricating oil of the lubricating oil supply device is driven by a unique power source in the carbon dioxide energy storage system. The unique power source is specifically the high-pressure carbon dioxide gas in the liquid storage unit, in this way, a driving control structure and a driving control process of the second oil supply unit are simpler, faster and more reliable, thereby improving the reliability of the emergency lubricating oil supply and enhancing safety performance of operation of the carbon dioxide energy storage system.

DETAILED DESCRIPTION OF EMBODIMENTS

Figure 1:
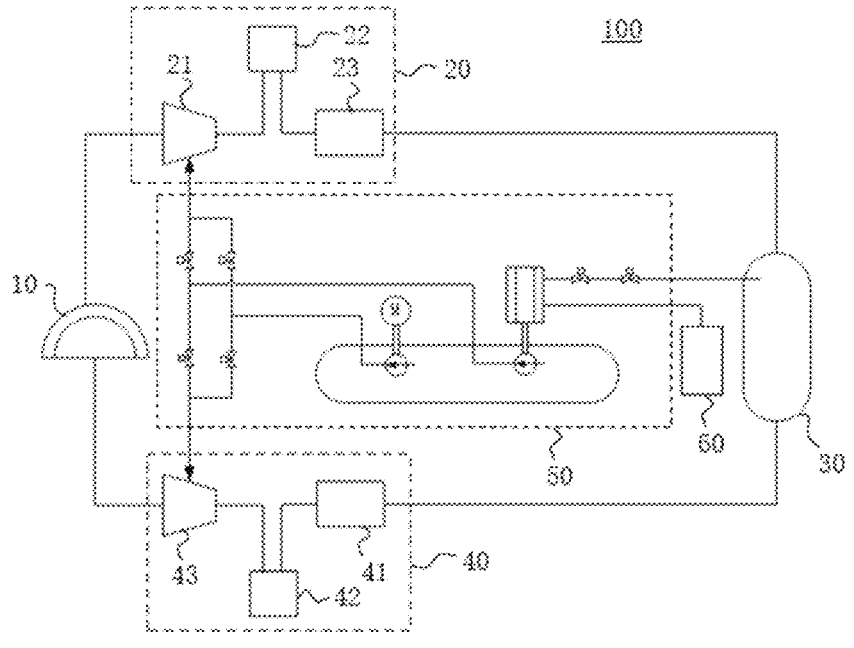
FIG. 1 illustrates a schematic structural diagram of a carbon dioxide energy storage system according to an embodiment of the disclosure.

To make objectives, technical solutions, and advantages of the disclosure clearer, embodiments of the disclosure will be described in detail as follows with reference to attached drawings. These embodiments are illustrated in the attached drawings. The embodiments of the disclosure illustrated in the attached drawings and described with reference to the attached drawings are merely illustrative, and the disclosure is not limited to these embodiments.

It should be noted that, same or similar reference numerals in the attached drawings of the embodiments of the disclosure correspond to the same or similar components. In description of the disclosure, it should be understood that, orientational or positional relationships indicated by terms "up", "down", "left", "right" and so on are based on orientational or positional relationships illustrated in the attached drawings and are only for convenience of describing the disclosure and simplifying description, rather than indicating or implying that device or component referred to must have a specific orientation and be constructed and operated in a specific orientation. Therefore, the terms describing the positional relationships in the attached drawings are only used for illustrative purposes and cannot be understood as a limitation to the disclosure. For those skilled in the art, specific meaning of the aforementioned terms can be understood according to specific situation.

It should also be noted that in order to avoid blurring the disclosure due to unnecessary details, only structures and/or processing steps closely related to the technical solutions of the disclosure are shown in the attached drawings, and other details that are not closely related to the disclosure are omitted.

Figure 2:
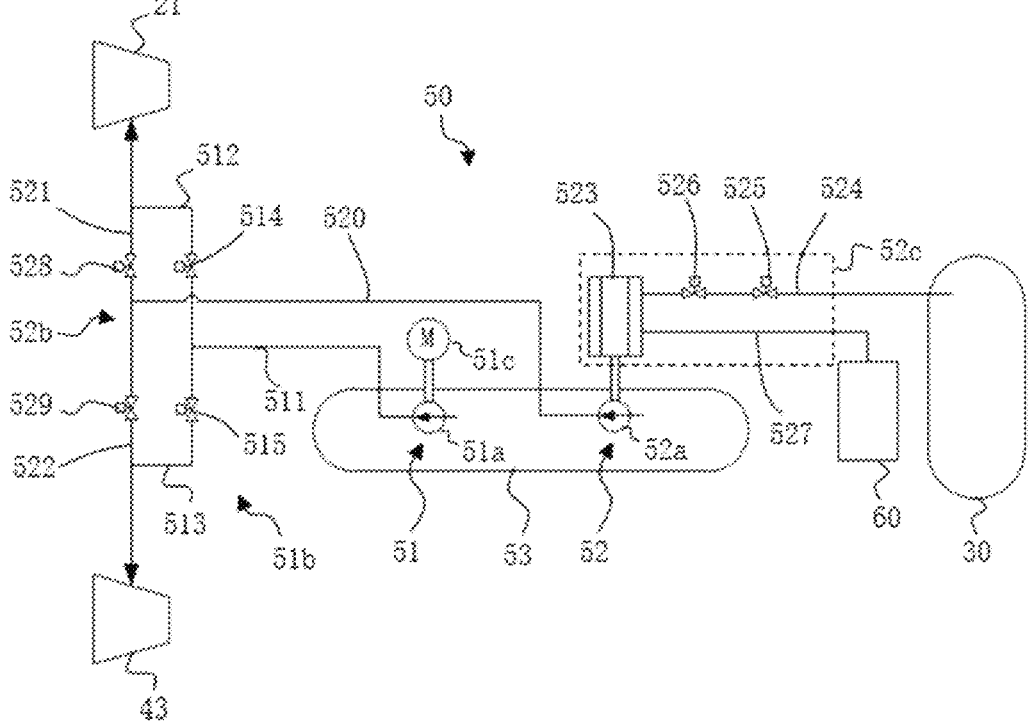
FIG. 2 illustrates a schematic structural diagram of a lubricating oil supply device of the carbon dioxide energy storage system according to an embodiment of the disclosure.

As illustrated in FIG. 1 and FIG. 2, an embodiment of the disclosure firstly provides a lubricating oil supply device 50 and a carbon dioxide energy storage system 100 including the lubricating oil supply device 50.

Specifically, as illustrated in FIG. 1, the carbon dioxide energy storage system 100 mainly includes a gas storage unit 10, an energy storage component 20, a liquid storage unit 30, and an energy release component 40 sequentially connected in a closed loop. The gas storage unit 10 is configured to store gaseous carbon dioxide at atmospheric pressure. The liquid storage unit 30 is configured to store liquid carbon dioxide. The gaseous carbon dioxide flowing out from the gas storage unit 10 is transformed into liquid carbon dioxide with a preset energy storage pressure through the energy storage component 20 and then flows into the liquid storage unit 30, and energy storage is completed in this process. The liquid carbon dioxide output from the liquid storage unit 30 is transformed into the gaseous carbon dioxide at the atmospheric pressure through the energy release component 40 and then flows into the gas storage unit 10, and energy release and application are completed in this process. Conventionally, the energy storage component 20 compresses and liquefies the gaseous carbon dioxide into the liquid carbon dioxide to store in the liquid storage unit 30 during a low power consumption period or by utilizing curtailment of wind or solar power to thereby convert electric energy into compression energy and heat energy for storage. During a peak power consumption period, the energy release component 40 vaporizes and expands the liquid carbon dioxide to do work, thereby releasing energy stored and converting it into the electric energy for use.

Specific compositions and structures of the gas storage unit 10, the energy storage component 20, the liquid storage unit 30, and the energy release component 40 can refer to technologies in the art for implementation, for example, technical solutions disclosed by Chinese patents with publication No. CN116221616A, No. CN117628836A, and No. CN116857027A. The liquid storage unit 30 preferably uses a matrix self-balancing liquid storage unit as disclosed in a Chinese patent with a publication No. CN222026765U.

In the embodiment, as illustrated in FIG. 1, the energy storage component 20 mainly includes a compressor 21, an energy storage side heat exchanger 22, and a condenser 23 sequentially connected between the gas storage unit 10 and the liquid storage unit 30. In a compression heat release energy storage loop, the gaseous carbon dioxide is compressed by the compressor 21, cooled by the energy storage side heat exchanger 22, and then liquefied by the condenser 23 to form the liquid carbon dioxide to store in the liquid storage unit 30.

In the embodiment, as illustrated in FIG. 1, the energy release component 40 mainly includes an evaporator 41, an energy release side heat exchanger 42, and a turbine 43 sequentially connected between the liquid storage unit 30 and the gas storage unit 10. In a heat absorption expansion energy release loop, the liquid carbon dioxide absorbs heat, gasifies and expands in the evaporator 41, is further heated by the energy release side heat exchanger 42, then does external work (for example, generates electricity) through the turbine 43 to release energy, and is finally converted into the gaseous carbon dioxide at the atmospheric pressure to store in the gas storage unit 10.

In the embodiment, the energy storage component 20 and the energy release component 40 both include high-speed rotating mechanical devices, mainly the compressor 21 in the energy storage component 20 and the turbine 43 in the energy release component 40. These high-speed rotating mechanical devices need to be equipped with corresponding lubricating oil supply devices. In related art, a lubricating oil supply device in the carbon dioxide energy storage system is similar to that in a generator set in a traditional thermal power generation system, mainly including one or two (one in use and one for standby) main working oil pumps driven by alternating current asynchronous motors and one emergency oil pump driven by a direct current motor. When the generator set is in normal operation, the main working oil pumps are driven by alternating current power supplied by a plant power system to supply lubricating oil. In a case of emergency, such as a power failure in the plant power system, the emergency oil pump is quickly started by an independent direct current battery and a corresponding electronic control system to ensure emergency shutdown of the generator set. In related art, an electronic control system of the emergency oil pump is relatively complicated with many nodes requiring controlling, resulting in a high failure rate. In the case of emergency, failure of the emergency oil pump to start in an interlocked manner may lead to safety accidents and significant economic losses. Therefore, safety performance of the lubricating oil supply device needs to be further improved. In a process of exploring solutions to this problem, the applicant of the disclosure finds that by combining a unique power source of the carbon dioxide energy storage system 100 and changing a driving mode of the emergency oil pump, reliability of the emergency oil pump can be improved. Specifically, in the carbon dioxide energy storage system 100, a liquid storage container disposed in the liquid storage unit 30 for storing the liquid carbon dioxide contains a large amount of high-pressure carbon dioxide gas in a pressure-maintaining pipeline at a top of the liquid storage container under an energy storage condition or an energy release condition, and the high-pressure carbon dioxide gas in the pressure-maintaining pipeline can be used as a power source to drive the emergency oil pump.

Based on the aforementioned concept, an embodiment of the disclosure provides a lubricating oil supply device of the carbon dioxide energy storage system. Specifically, as illustrated in FIG. 1 and FIG. 2, the lubricating oil supply device 50 provided by the disclosure mainly includes a lubricating oil tank 53, a first oil supply unit 51, and a second oil supply unit 52. The first oil supply unit 51 and the second oil supply unit 52 are respectively connected among the lubricating oil tank 53, the energy storage component 20, and the energy release component 40. The first oil supply unit 51 is configured to supply a first oil amount of the lubricating oil to the energy storage component 20 and the energy release component 40. The second oil supply unit 52 is configured to supply a second oil amount of the lubricating oil to the energy storage component 20 and the energy release component 40. The second oil supply unit 52 is connected to the liquid storage unit 30 and driven by taking the high-pressure carbon dioxide gas contained in the liquid storage unit 30 as a power source to supply the lubricating oil.

In the lubricating oil supply device 50, when the carbon dioxide energy storage system 100 is in the normal operation, the first oil supply unit 51 supplies the lubricating oil to the energy storage component 20 and the energy release component 40; and when the carbon dioxide energy storage system 100 is in a failing state to cause the first oil supply unit 51 unable to supply the lubricating oil, the second oil supply unit 52 is controlled to simultaneously supply the lubricating oil to the energy storage component 20 and the energy release component 40; that is, the second oil supply unit 52 is mainly configured to supply emergency lubricating oil. In the lubricating oil supply device 50, the second oil supply unit 52 configured to supply the emergency lubricating oil is driven by the unique power source of the carbon dioxide energy storage system 100. The unique power source is specifically the high-pressure carbon dioxide gas in the liquid storage unit 30. In this way, a driving control structure and a driving control process of the second oil supply unit 52 are simpler, faster in a response speed, and more reliable, thereby effectively improving reliability of emergency lubricating oil supply and enhancing safety performance of operation of the carbon dioxide energy storage system. Compared with a method in the art for controlling an emergency oil supply unit by using a direct current battery and a corresponding electronic control system, the technical solution in the disclosure does not require additionally disposing the direct current battery outside the carbon dioxide energy storage system as a power source, thereby optimizing an overall structure of the carbon dioxide energy storage system and saving cost and electricity.

It should be noted that, the aforementioned supplying the lubricating oil to the energy storage component 20 and the energy release component 40 refers to supplying the lubricating oil to rotating mechanical devices of the energy storage component 20 and the energy release component 40, specifically the compressor 21 in the energy storage component 20 and the turbine 43 in the energy release component 40.

In the embodiment, as illustrated in FIG. 2, the first oil supply unit 51 mainly includes a first oil pump 51a, a first pipeline 51b, and a first driving mechanism 51c. The first oil pump 51a is disposed inside the lubricating oil tank 53 and connected to the energy storage component 20 and the energy release component 40 through the first pipeline 51b, specifically to the compressor 21 and the turbine 43. The first driving mechanism 51c is configured to drive the first oil pump 51a to supply the first oil amount of the lubricating oil.

Specifically, the first pipeline 51b includes a first oil supply main pipeline 511, a first oil supply branch 512, and a second oil supply branch 513. A first end of the first oil supply main pipeline 511 is connected to an output end of the first oil pump 51a. First ends of the first oil supply branch 512 and the second oil supply branch 513 are individually connected to a second end of the first oil supply main pipeline 511. A second end of the first oil supply branch 512 is connected to the energy storage component 20, specifically to the compressor 21. A second end of the second oil supply branch 413 is connected to the energy release component 40, specifically to the turbine 43.

In an embodiment, a first oil supply valve 514 is disposed on the first oil supply branch 512. A second oil supply valve 515 is disposed on the second oil supply branch 513. By controlling opening and closing states of the first oil supply valve 514 and the second oil supply valve 515, the first oil supply unit 51 can be controlled to supply the lubricating oil to the energy storage component 20 and/or the energy release component 40.

In the embodiment, the first driving mechanism 51c is a driving motor, specifically an alternating current driving motor.

In the embodiment, as illustrated in FIG. 2, the second oil supply unit 52 mainly includes a second oil pump 52a, a second pipeline 52b, and a second driving mechanism 52c. The second oil pump 52a is disposed inside the lubricating oil tank 53 and connected to the energy storage component 20 and the energy release component 40 through the second pipeline 52b, specifically to the compressor 21 and the turbine 43. The second driving mechanism 52c is a pneumatic rotary driving mechanism and connected to the liquid storage unit 30. The second driving mechanism 52c is configured to drive, under rotation driven by the high-pressure carbon dioxide gas contained in the liquid storage unit 30, the second oil pump 52a to supply the second oil amount of the lubricating oil.

Specifically, the second pipeline 52b includes a second oil supply main pipeline 520, a third oil supply branch 521, and a fourth oil supply branch 522. A first end of the second oil supply main pipeline 520 is connected to an output end of the second oil pump 52a. First ends of the third oil supply branch 521 and the fourth oil supply branch 522 are individually connected to a second end of the second oil supply main pipeline 520. A second end of the third oil supply branch 521 is connected to the energy storage component 20, specifically to the compressor 21. A second end of the fourth oil supply branch 522 is connected to the energy release component 40, specifically to the turbine 43.

In the embodiment, as illustrated in FIG. 2, the second driving mechanism 52c includes a vane rotary cylinder 523, a gas pipeline 524, and a charged normally closed solenoid valve 525. The vane rotary cylinder 523 is connected to the second oil pump 52a and configured to rotationally drive the second oil pump 52a. The gas pipeline 524 is connected between the liquid storage unit 30 and the vane rotary cylinder 523 and configured to transport the high-pressure carbon dioxide gas in the liquid storage unit 30 to the vane rotary cylinder 523 to thereby drive the vane rotary cylinder 523 to rotate. The charged normally closed solenoid valve 525 is connected to the gas pipeline 524 and configured to control communication or interruption of the gas pipeline 524, to thereby control whether to start the second oil pump 52a. It should be noted that, the charged normally closed solenoid valve 525 refers to a normally closed solenoid valve that is closed when energized and opened when de-energized.

The second driving mechanism 52c mentioned above only needs to control the charged normally closed solenoid valve 525 to be de-energized and thereby open, so as to make the gas pipeline 524 in communication, thereby inputting the high-pressure carbon dioxide gas from the liquid storage unit 30 into the vane rotary cylinder 523, driving the vane rotary cylinder 523 to rotate, and the vane rotary cylinder 523 drives, under rotation driven by the high-pressure carbon dioxide, the second oil pump 52a to supply the emergency lubricating oil. This driving control structure and driving control process are simpler, faster, and more reliable, thereby improving reliability of the second oil supply unit 52 (i.e., the emergency oil supply unit) and enhancing the safety performance of the operation of the carbon dioxide energy storage system. Specifically, when the carbon dioxide energy storage system 100 experiences a power failure accident, the charged normally closed solenoid valve 525 is automatically de-energized and thereby opens; in this way, the emergency lubricating oil can be supplied in time, and a response speed is fast.

Further, a gas pressure regulating valve 526 is disposed on the gas pipeline 524. By controlling a pressure of the high-pressure carbon dioxide gas input to the vane rotary cylinder 523 through the gas pressure regulating valve 526, a rotating speed of the vane rotary cylinder 523 is adjusted, thereby controlling an amount of the lubricating oil supplied by the second oil pump 52a.

Conventionally, as illustrated in FIG. 1 and FIG. 2, the carbon dioxide energy storage system 100 further includes a shaft seal gas storage container 60. The shaft seal gas storage container 60 is configured to store shaft seal gas and supply the shaft seal gas to the compressor 21 and the turbine 43. In the embodiment, as illustrated in FIG. 2, the second driving mechanism 52c further includes an exhaust pipeline 527. The exhaust pipeline 527 is connected between the vane rotary cylinder 523 and the shaft seal gas storage container 60. The exhaust pipeline 527 is configured to transport carbon dioxide gas discharged by the vane rotary cylinder 523 to the shaft seal gas storage container 60. Because the high-pressure carbon dioxide gas input from the liquid storage unit 30 to the vane rotary cylinder 523 is a circulating working medium of the carbon dioxide energy storage system 100, the high-pressure carbon dioxide gas drives the vane rotary cylinder 523 to rotate and then is recovered to the shaft seal gas storage container 60, and then can be returned to a circulating pipeline of the carbon dioxide energy storage system 100 through a shaft seal gas pipeline, thereby avoiding a loss of the circulating working medium.

A control method for the aforementioned lubricating oil supply device 50 and the carbon dioxide energy storage system 100 corresponding thereto mainly includes (a1) and (b1).

(a1) The first oil supply unit 51 is controlled to simultaneously supply the lubricating oil to the energy storage component 20 and the energy release component 40 when the carbon dioxide energy storage system 100 is in the normal operation. By controlling the opening and closing states of the first oil supply valve 514 and the second oil supply valve 515, the lubricating oil can be selectively supplied to the compressor 21 in the energy storage component 20 and/or the turbine 43 in the energy release component 40.

(b1) The high-pressure carbon dioxide gas in the liquid storage unit 30 is controlled to start the second oil supply unit 52 to simultaneously supply the lubricating oil to the energy storage component 20 and the energy release component 40 when the carbon dioxide energy storage system 100 is in the failing state to cause the first oil supply unit 51 unable to supply the lubricating oil.

As described above, the first oil supply unit 51 supplies the lubricating oil to the energy storage component 20 and the energy release component 40 when the carbon dioxide energy storage system 100 is in the normal operation. However, during an operation process of the carbon dioxide energy storage system 100, an energy storage process and an energy release process are typically not carried out simultaneously. An operational principle of the carbon dioxide energy storage system 100 requires the energy storage component 20 and the energy release component 40 to alternately and frequently start up and shut down (referred to as "cyclic loading"). That is, both the compressor 21 in the energy storage component 20 and the turbine 43 in the energy release component 40 must alternately and frequently switch between a startup operation condition and a turning operation condition. Therefore, total times of the high-speed rotating mechanical devices in the turning operation condition are relatively long, while in the turning operation condition, the high-speed rotating mechanical devices only need a small amount of the lubricating oil to meet requirements of turning. Therefore, when the lubricating oil is supplied by the first oil supply unit 51 under the turning operation condition, a power of the first oil pump 51a is relatively high, and an amount of the lubricating oil supplied by the first oil supply unit 51 is much greater than an amount of the lubricating oil required for the turning, which not only increases energy consumption of the carbon dioxide energy storage system 100 but also increases a loss of the lubricating oil.

It should be noted that, the turning operation condition refers to continuous turning of a rotating device when the rotating device enters a shutdown state from a high-speed operation state. Due to a high body temperature of the rotating device during a process of entering the shutdown state, and to avoid uneven temperature distribution and thermal stress caused by a large temperature difference between upper and lower cylinders after the rotating device is shut down, the continuous turning is required to eliminate the thermal stress until the rotating device finally stops running completely.

To reduce the energy consumption of the carbon dioxide energy storage system 100 and the loss of the lubricating oil, in the embodiment, the lubricating oil supply device 50 is further improved, and the second oil supply unit 52 is improved to supply turning lubricating oil. That is, in the lubricating oil supply device 50 provided by the embodiment, when the compressor 21 in the energy storage component 20 and the turbine 43 in the energy release component 40 are both in the startup operation condition, the first oil supply unit 51 supplies operating lubricating oil to the compressor 21 and the turbine 43; when the compressor 21 in the energy storage component 20 and the turbine 43 in the energy release component 40 are both in the turning operation condition, the second oil supply unit 52 supplies the turning lubricating oil to the compressor 21 and the turbine 43; when an emergency occurs and the carbon dioxide energy storage system 100 need to be shut down, the second oil supply unit 52 supplies the emergency lubricating oil.

To achieve the aforementioned objective, in the lubricating oil supply device 50 provided by the embodiment, firstly, the second oil amount is set to be smaller than the first oil amount. That is, the second oil amount of the lubricating oil supplied by the second oil supply unit 52 to the energy storage component 20 and the energy release component 40 is less than the first oil amount of the lubricating oil supplied by the first oil supply unit 51 to the energy storage component 20 and the energy release component 40. Subsequently, in the second pipeline 52b of the second oil supply unit 52, as illustrated in FIG. 2, a third oil supply valve 528 is disposed on the third oil supply branch 521, and a fourth oil supply valve 529 is disposed on the fourth oil supply branch 522. By controlling opening and closing states of the third oil supply valve 528 and the fourth oil supply valve 529, the second oil supply unit 52 can be controlled to selectively supply the lubricating oil to the energy storage component 20 and/or the energy release component 40.

In the lubricating oil supply device 50 as described above, the second oil supply unit 52 used to supply the emergency lubricating oil is reused to supply the turning lubricating oil, and the emergency lubricating oil and the turning lubricating oil are supplied through a same oil supply pipeline. In some faults, such as power failure of the carbon dioxide energy storage system 100 caused by loss of plant power supply, the third oil supply branch 521 and the fourth oil supply branch 522 should be kept in communication. Therefore, in the embodiment, the third oil supply valve 528 on the third oil supply branch 521 and the fourth oil supply valve 529 on the fourth oil supply branch 522 are selected as solenoid valves that are closed when energized and opened when de-energized. When de-energized by the power failure of the carbon dioxide energy storage system 100, the third oil supply valve 528 and the fourth oil supply valve 529 are in the opening states, so that the third oil supply branch 521 and the fourth oil supply branch 522 remain in communication.

In the embodiment, the first oil amount is 2-3 times of the second oil amount.

Based on the lubricating oil supply device 50 improved and the carbon dioxide energy storage system 100 corresponding thereto, the control method mainly includes (a2), (b2), (c), and (d).

(a2) The first oil supply unit 51 is controlled to supply the lubricating oil to the energy storage component 20, and the second oil supply unit 52 is controlled to supply the lubricating oil to the energy release component 40, when the carbon dioxide energy storage system 100 is in the normal operation, the energy storage component 20 is in an energy storage operation condition and the energy release component 40 is in the turning operation condition.

Specifically, when the carbon dioxide energy storage system 100 is in the normal operation, the energy storage component 20 is in the energy storage operation condition, and the energy release component 40 is in the turning operation condition, in the first oil supply unit, the first driving mechanism 51c drives the first oil pump 51a to start, controls the first oil supply valve 514 to open, and controls the second oil supply valve 515 to close. The first amount of the lubricating oil supplied by the first oil pump 51a is transported to the compressor 21 in the energy storage component 20 through the first oil supply main pipeline 511 and the first oil supply branch 512. In the second oil supply unit 52, the second driving mechanism 52c drives the second oil pump 52a to start, controls the third oil supply valve 528 to close, and controls the fourth oil supply valve 529 to open. The second amount of the lubricating oil supplied by the second oil pump 52a is transported to the turbine 43 in the energy release component 40 through the second oil supply main pipeline 520 and the fourth oil supply branch 522.

(b2) The first oil supply unit 51 is controlled to supply the lubricating oil to the energy release component 40, and the second oil supply unit 52 is controlled to supply the lubricating oil to the energy storage component 20, when the carbon dioxide energy storage system 100 is in the normal operation, the energy release component 40 is in an energy release operation condition, and the energy storage component 20 is in the turning operation condition.

Specifically, when the carbon dioxide energy storage system 100 is in the normal operation, the energy release component 40 is in the energy release operation condition, and the energy storage component 20 is in the turning operation condition, in the oil supply unit 51, the first driving mechanism 51c drives the first oil pump 51a to start, controls the first oil supply valve 514 to close, and controls the second oil supply valve 515 to open. The first amount of the lubricating oil supplied by the first oil pump 51a is transported to the turbine 43 in the energy release component 40 through the first oil supply main pipeline 511 and the second oil supply branch 513. In the second oil supply unit 52, the second driving mechanism 52c drives the second oil pump 52a to start, controls the third oil supply valve 528 to open, and controls the fourth oil supply valve 529 to close. The second amount of the lubricating oil supplied by the second oil pump 52a is transported to the compressor 21 in the energy storage component 20 through the second oil supply main pipeline 520 and the third oil supply branch 521.

(c) The second oil supply unit 52 is controlled to supply the lubricating oil to the energy storage component 20 and the energy release component 40, respectively, when the energy storage component 20 and the energy release component 40 are both in the turning operation condition.

Specifically, when the carbon dioxide energy storage system 100 is in the normal operation and the energy storage component 20 and the energy release component 40 both are in the turning operation condition, the first oil supply unit 51 is closed, and in the second oil supply unit 52, the second driving mechanism 52c drives the second oil pump 52a to start and controls the third oil supply valve 528 and the fourth oil supply valve 529 to open. The second amount of the lubricating oil supplied by the second oil pump 52a is simultaneously transported to the compressor 21 in the energy storage component 20 and the turbine 43 in the energy release component 40.

(d) The second oil supply unit 52 is controlled to simultaneously supply the lubricating oil to the energy storage component 20 and the energy release component 40, when the carbon dioxide energy storage system 100 is in the failing state to cause the first oil supply unit 51 unable to supply the lubricating oil.

The lubricating oil supply device 50 as described above can control the second oil supply unit 52 to supply a relatively small oil amount of the lubricating oil meeting the requirement of the turning operation condition when the energy storage component 20 and the energy release component 40 are both in the turning operation condition, thereby not only reducing the energy consumption of the carbon dioxide energy storage system 100, but also decreasing the loss of the lubricating oil.

To sum up, the disclosure provides the carbon dioxide energy storage system, the lubricating oil supply device thereof, and the control method therefor. The second oil supply unit for supplying the emergency lubricating oil of the lubricating oil supply device is driven by the unique power source in the carbon dioxide energy storage system. The unique power source is specifically the high-pressure carbon dioxide gas in the liquid storage unit; in this way, the driving control structure and the driving control process of the second oil supply unit are simpler, faster in the response speed, and more reliable, thereby improving the reliability of the emergency lubricating oil supply and enhancing the safety performance of the operation of the carbon dioxide energy storage system. In a further embodiment, the second oil supply unit is reused to supply the turning lubricating oil. The second oil supply unit supplies the relatively small oil amount of the lubricating oil meeting the requirement of the turning operation condition when the energy storage component and the energy release component are both in the turning operation condition, thereby not only reducing the energy consumption of the carbon dioxide energy storage system, but also decreasing the loss of the lubricating oil.

The above content is only a part of the embodiments of the disclosure. It should be pointed out that for those skilled in the art, several improvements and embellishments can be made without departing from principles of the disclosure, and these improvements and embellishments shall fall within a scope of protection of the disclosure.

What is claimed is:

1. A control method for a carbon dioxide energy storage system, wherein the carbon dioxide energy storage system comprises a gas storage unit, an energy storage component, a liquid storage unit, and an energy release component sequentially connected in a closed loop; and the carbon dioxide energy storage system further comprises a lubricating oil supply device; the liquid storage unit is configured to store liquid carbon dioxide, and high-pressure carbon dioxide gas is contained in the liquid storage unit;

wherein the lubricating oil supply device comprises a first oil supply unit and a second oil supply unit respectively connected among a lubricating oil tank, the energy storage component, and the energy release component; the first oil supply unit is configured to supply a first oil amount of lubricating oil to the energy storage component and the energy release component, and the second oil supply unit is configured to supply a second oil amount of the lubricating oil to the energy storage component and the energy release component; the second oil supply unit is connected to the liquid storage unit and driven by taking the high-pressure carbon dioxide gas contained in the liquid storage unit as a power source to supply the lubricating oil; and wherein the second oil amount is smaller than the first oil amount, and the control method comprises:

controlling the first oil supply unit to supply the lubricating oil to the energy storage component and controlling the second oil supply unit to supply the lubricating oil to the energy release component, when the carbon dioxide energy storage system is in normal operation, the energy storage component is in an energy storage operation condition and the energy release component is in a turning operation condition;

controlling the first oil supply unit to supply the lubricating oil to the energy release component and controlling the second oil supply unit to supply the lubricating oil to the energy storage component, when the carbon dioxide energy storage system is in the normal operation, the energy release component is in an energy release operation condition, and the energy storage component is in the turning operation condition;

controlling the second oil supply unit to simultaneously supply the lubricating oil to the energy storage component and the energy release component when the carbon dioxide energy storage system is in a failing state to cause the first oil supply unit unable to supply the lubricating oil.

2. The control method as claimed in claim 1, wherein the second oil supply unit comprises a second oil pump, a second pipeline, and a second driving mechanism; the second oil pump is disposed inside the lubricating oil tank and connected to the energy storage component and the energy release component through the second pipeline; the second driving mechanism is a pneumatic rotary driving mechanism and connected to the liquid storage unit; and the second driving mechanism is configured to drive, under rotation driven by the high-pressure carbon dioxide gas contained in the liquid storage unit, the second oil pump to supply the lubricating oil.

3. The control method as claimed in claim 2, wherein the second driving mechanism comprises:

a vane rotary cylinder, connected to the second oil pump and configured to rotationally drive the second oil pump;

a gas pipeline, connected between the liquid storage unit and the vane rotary cylinder and configured to transport the high-pressure carbon dioxide gas in the liquid storage unit to the vane rotary cylinder to thereby drive the vane rotary cylinder to rotate; and a charged normally closed solenoid valve, connected to the gas pipeline.

4. The control method as claimed in claim 3, wherein the carbon dioxide energy storage system further comprises a shaft seal gas storage container, and the shaft seal gas storage container is configured to store shaft seal gas; the second driving mechanism further comprises an exhaust pipeline, the exhaust pipeline is connected between the vane rotary cylinder and the shaft seal gas storage container, the exhaust pipeline is configured to transport carbon dioxide gas discharged by the vane rotary cylinder to the shaft seal gas storage container; and a gas pressure regulating valve is disposed on the gas pipeline.

5. The control method as claimed in claim 4, wherein the first oil supply unit comprises a first oil pump, a first pipeline, and a first driving mechanism; the first oil pump is disposed inside the lubricating oil tank and connected to the energy storage component and the energy release component through the first pipeline; and the first driving mechanism is configured to drive the first oil pump;

the first pipeline comprises a first oil supply main pipeline, a first oil supply branch and a second oil supply branch; a first end of the first oil supply main pipeline is connected to an output end of the first oil pump, and first ends of the first oil supply branch and the second oil supply branch are individually connected to a second end of the first oil supply main pipeline; a second end of the first oil supply branch is connected to the energy storage component, and a second end of the second oil supply branch is connected to the energy release component; a first oil supply valve is disposed on the first oil supply branch, and a second oil supply valve is disposed on the second oil supply branch; and the second pipeline comprises a second oil supply main pipeline, a third oil supply branch and a fourth oil supply branch; a first end of the second oil supply main pipeline is connected to an output end of the second oil pump, and first ends of the third oil supply branch and the fourth oil supply branch are individually connected to a second end of the second oil supply main pipeline; a second end of the third oil supply branch is connected to the energy storage component, and a second end of the fourth oil supply branch is connected to the energy release component; a third oil supply valve is disposed on the third oil supply branch, and a fourth oil supply valve is disposed on the fourth oil supply branch.

6. The control method as claimed in claim 3, wherein the first oil supply unit comprises a first oil pump, a first pipeline, and a first driving mechanism; the first oil pump is disposed inside the lubricating oil tank and connected to the energy storage component and the energy release component through the first pipeline; and the first driving mechanism is configured to drive the first oil pump;

the first pipeline comprises a first oil supply main pipeline, a first oil supply branch and a second oil supply branch; a first end of the first oil supply main pipeline is connected to an output end of the first oil pump, and first ends of the first oil supply branch and the second oil supply branch are individually connected to a second end of the first oil supply main pipeline; a second end of the first oil supply branch is connected to the energy storage component, and a second end of the second oil supply branch is connected to the energy release component; a first oil supply valve is disposed on the first oil supply branch, and a second oil supply valve is disposed on the second oil supply branch; and
the second pipeline comprises a second oil supply main pipeline, a third oil supply branch and a fourth oil supply branch; a first end of the second oil supply main pipeline is connected to an output end of the second oil pump, and first ends of the third oil supply branch and the fourth oil supply branch are individually connected to a second end of the second oil supply main pipeline; a second end of the third oil supply branch is connected to the energy storage component, and a second end of the fourth oil supply branch is connected to the energy release component; a third oil supply valve is disposed on the third oil supply branch, and a fourth oil supply valve is disposed on the fourth oil supply branch.

7. The control method as claimed in claim 2, wherein the first oil amount is 2-3 times of the second oil amount.

8. The control method as claimed in claim 7, wherein the first oil supply unit comprises a first oil pump, a first pipeline, and a first driving mechanism; the first oil pump is disposed inside the lubricating oil tank and connected to the energy storage component and the energy release component through the first pipeline; and the first driving mechanism is configured to drive the first oil pump;

the first pipeline comprises a first oil supply main pipeline, a first oil supply branch and a second oil supply branch; a first end of the first oil supply main pipeline is connected to an output end of the first oil pump, and first ends of the first oil supply branch and the second oil supply branch are individually connected to a second end of the first oil supply main pipeline; a second end of the first oil supply branch is connected to the energy storage component, and a second end of the second oil supply branch is connected to the energy release component; a first oil supply valve is disposed on the first oil supply branch, and a second oil supply valve is disposed on the second oil supply branch; and
the second pipeline comprises a second oil supply main pipeline, a third oil supply branch and a fourth oil supply branch; a first end of the second oil supply main pipeline is connected to an output end of the second oil pump, and first ends of the third oil supply branch and the fourth oil supply branch are individually connected to a second end of the second oil supply main pipeline; a second end of the third oil supply branch is connected to the energy storage component, and a second end of the fourth oil supply branch is connected to the energy release component; a third oil supply valve is disposed on the third oil supply branch, and a fourth oil supply valve is disposed on the fourth oil supply branch.

9. The control method as claimed in claim 2, wherein the first oil supply unit comprises a first oil pump, a first pipeline, and a first driving mechanism; the first oil pump is disposed inside the lubricating oil tank and connected to the energy storage component and the energy release component through the first pipeline; and the first driving mechanism is configured to drive the first oil pump;

the first pipeline comprises a first oil supply main pipeline, a first oil supply branch and a second oil supply branch; a first end of the first oil supply main pipeline is connected to an output end of the first oil pump, and first ends of the first oil supply branch and the second oil supply branch are individually connected to a second end of the first oil supply main pipeline; a second end of the first oil supply branch is connected to the energy storage component, and a second end of the second oil supply branch is connected to the energy release component; a first oil supply valve is disposed on the first oil supply branch, and a second oil supply valve is disposed on the second oil supply branch; and
the second pipeline comprises a second oil supply main pipeline, a third oil supply branch and a fourth oil supply branch; a first end of the second oil supply main pipeline is connected to an output end of the second oil pump, and first ends of the third oil supply branch and the fourth oil supply branch are individually connected to a second end of the second oil supply main pipeline; a second end of the third oil supply branch is connected to the energy storage component, and a second end of the fourth oil supply branch is connected to the energy release component; a third oil supply valve is disposed on the third oil supply branch, and a fourth oil supply valve is disposed on the fourth oil supply branch.

* * * * *